US006830141B1

(12) United States Patent
Neelakantan et al.

(10) Patent No.: US 6,830,141 B1
(45) Date of Patent: Dec. 14, 2004

(54) FRICTION-BASED CLUTCH ACTUATION SYSTEM

(75) Inventors: Vijay A. Neelakantan, Columbus, OH (US); Norman Kenneth Bucknor, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/445,287

(22) Filed: May 23, 2003

(51) Int. Cl.[7] .............................................. F16D 19/00
(52) U.S. Cl. .................... 192/84.6; 192/84.7; 192/52.4; 188/72.1; 188/158
(58) Field of Search ........................ 192/83, 52.4, 84.6, 192/84.7, 84.1; 188/72.1, 158, 162

(56) References Cited

U.S. PATENT DOCUMENTS

| | | | | |
|---|---|---|---|---|
| 4,602,702 A | * | 7/1986 | Ohta et al. .................. | 188/72.1 |
| 5,090,518 A | * | 2/1992 | Schenk et al. ............. | 188/72.1 |
| 5,826,683 A | | 10/1998 | Murata et al. .............. | 188/161 |
| 5,896,965 A | | 4/1999 | Gopalswamy et al. ...... | 192/21.5 |
| 6,167,997 B1 | * | 1/2001 | Keeney ........................ | 192/40 |
| 2004/0040816 A1 | * | 3/2004 | Reul et al. ............... | 192/85 CA |

FOREIGN PATENT DOCUMENTS

| | | | | |
|---|---|---|---|---|
| JP | 401242830 A | * | 9/1989 | ........... F16D/27/10 |
| JP | WO02/93032 | | 11/2002 | |

\* cited by examiner

*Primary Examiner*—Charles A. Marmor
*Assistant Examiner*—Eric Williams
(74) *Attorney, Agent, or Firm*—Kathryn A. Marra

(57) ABSTRACT

A friction-based clutch actuation system includes a rotatable input shaft, an output shaft, at least one input clutch plate operatively supported by the input shaft, and at least one output clutch plate operatively supported by the output shaft and moveable thereon. The friction-based clutch actuation system also includes at least one electric motor and at least one piezoelectric actuator operatively connected to the at least one electric motor. The friction-based clutch actuation system further includes a controller electrically connected to the at least one electric motor and the at least one piezoelectric actuator to activate said at least one electric motor to move the piezoelectric actuator relative to the at least one output clutch plate and to activate the piezoelectric actuator to apply a force to the at least one output clutch plate to engage the at least one input clutch plate.

34 Claims, 2 Drawing Sheets

FRICTION-BASED CLUTCH ACTUATION SYSTEM

TECHNICAL FIELD

The present invention relates generally to clutch actuation systems for vehicles and, more particularly, to a friction-based clutch actuation system for a powertrain of a vehicle.

BACKGROUND OF THE INVENTION

It is known to provide a clutch actuation system for a powertrain of a vehicle such as a motor vehicle. In the powertrain, the clutch actuation system may be used to shift gears in an automatic transmission. Typically, the clutch actuation system is of a hydraulic type. The hydraulic clutch actuation system has a plurality of input clutch plates connected to an input shaft and a plurality of output clutch plates connected to an output shaft and alternated between the input clutch plates. When the hydraulic clutch actuation system is not applied, these plates are free to rotate relative to each other. To apply the hydraulic clutch actuation assembly, a fluid actuating device such as a hydraulic piston is slidingly mounted for axial movement on an input clutch retainer connected to the input shaft. Fluid pressure between the input clutch retainer and the hydraulic piston causes the hydraulic piston to engage the input clutch plates with the output clutch plates. A return spring is disposed between the hydraulic piston and a retainer connected to the input shaft to bias or return the hydraulic piston to its non-displaced or non-applied position. However, in the automatic transmission, the hydraulic clutch actuation system requires high stroke (~mm) and high force (~kNs). This results in hydraulic pump losses, low robustness, poor efficiency, and a penalty in fuel economy.

Prior clutch actuation systems have explored the use of motors, electromagnets, and smart materials like magnetorheological fluids. These systems, while they tend to eliminate the disadvantages of the hydraulic clutch actuation system, lead to other disadvantages. In addition, other clutch actuation systems have used piezoelectric and magnetostrictive materials and servo motors. While electric motors typically offer high stroke (~mm), they suffer from the disadvantage of low force (~Ns). While piezoelectric and magnetostrictive actuators typically offer high force (~kNs), they suffer from the disadvantage of small stroke (~$\mu$ms).

As a result, it is desirable to provide a friction-based clutch actuation system that has easily controllable mechanisms. It is also desirable to provide a friction-based clutch actuation system that has quick response. It is further desirable to provide a friction-based clutch actuation system that has improved efficiency. It is still further desirable to provide a friction-based clutch actuation system that eliminates disadvantages of existing hydraulic clutch actuation systems. Therefore, there is a need in the art to provide a friction-based clutch actuation system that meets these desires.

SUMMARY OF THE INVENTION

It is, therefore, one object of the present invention to provide a friction-based clutch actuation system.

It is another object of the present invention to provide a friction-based clutch actuation system that splits stoke and force functions.

To achieve the foregoing objects, the present invention is a friction-based clutch actuation system including a rotatable input shaft, an output shaft, at least one input clutch plate operatively supported by the input shaft, and at least one output clutch plate operatively supported by the output shaft and moveable thereon. The friction-based clutch actuation system also includes at least one electric motor and at least one piezoelectric actuator operatively connected to the at least one electric motor. The friction-based clutch actuation system further includes a controller electrically connected to the at least one electric motor and the at least one piezoelectric actuator. The controller activates the at least one electric motor to move the at least one piezoelectric actuator relative to the at least one output clutch plate. The controller also activates the piezoelectric actuator to apply a force to the at least one output clutch plate to engage the at least one output clutch plate.

One advantage of the present invention is that a friction-based clutch actuation system is provided. Another advantage of the present invention is that the friction-based clutch actuation system uses piezoelectric actuators for force and direct current motors for stroke to split the force and stroke functions of the friction-based clutch actuation system. Yet another advantage of the present invention is that the friction-based clutch actuation system eliminates the hydraulic pump and hydraulic pump losses, thereby improving vehicle fuel economy. Still another advantage of the present invention is that the friction-based clutch actuation system eliminates drawbacks of existing hydraulic actuation like poor robustness, leading to better performance and quick response. A further advantage of the present invention is that the friction-based clutch actuation system has a simple construction. Yet a further advantage of the present invention is that the friction-based clutch actuation system has a direct interface with electronics, leading to easier and more precise control. Still a further advantage of the present invention is that the friction-based clutch actuation system has lower power consumption because very little power is required to maintain engagement. Another advantage of the present invention is that the friction-based clutch actuation system may incorporate a dual stage using a cam such that a first stage provides a long stroke with relatively low force and the second stage provides a high force but with a short stroke. Yet another advantage of the present invention is that the friction-based clutch actuation system can be used for rotating and non-rotating clutches.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
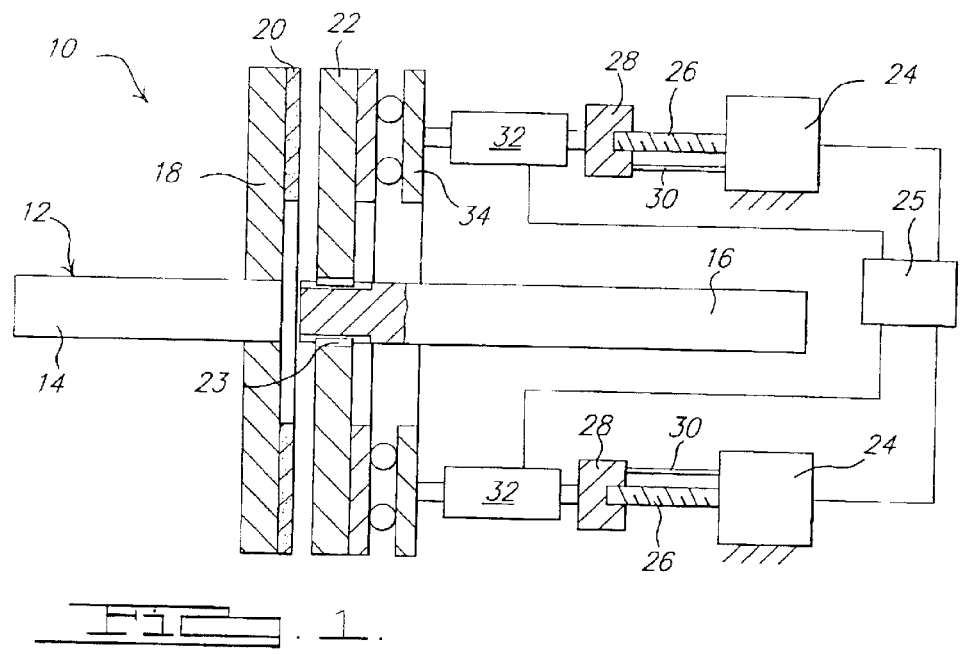
FIG. 1 is a diagrammatic fragmentary elevational view of a friction-based clutch actuation system, according to the present invention.

Referring to the drawings and in particular FIG. 1, one embodiment of a friction-based clutch actuation system 10, according to the present invention, is shown for a powertrain, generally indicated at 12 and partially shown, of a vehicle (not shown). The vehicle 12 is of a motor vehicle or automotive vehicle type. The powertrain 12 has a rotatable input shaft 14 and a rotatable output shaft 16 spaced axially from the input shaft 14. It should be appreciated that, except for the friction-based clutch actuation system 10, the powertrain 12 is conventional and known in the art. It should be appreciated that the friction-based clutch actuation system 10 may be used in other applications such as automotive braking and all-wheel-drive systems.

The friction-based clutch actuation system 10 includes at least one input clutch plate 18 operatively supported by and rotatable with the input shaft 14. The input clutch plate 18 has a friction lining 20 rigidly attached to one side thereof. The friction-based clutch actuation system 10 also includes at least one output clutch plate 22 operatively supported by and rotatable with the output shaft 16. Preferably, the output clutch plate 22 is splined 23 to the output shaft 16. It should be appreciated that the output clutch plate 22 can axially slide on the output shaft 16 while rotating with the output shaft 16.

The friction-based clutch actuation system 10 includes at least one, preferably a plurality of electric motors 24 operatively supported by the powertrain 12. The electric motors 24 are of a direct current (DC) type and electrically connected to a source of power such as an electronic controller 25 by suitable means such as wires (not shown). The electric motors 24 are spaced circumferentially about the output shaft 16. It should be appreciated that the electric motors 24 are activated by a voltage command from the controller 25 and used for a stroke mode of the friction-based clutch actuation system 10. It should also be appreciated that the controller 25 is conventional and known in the art.

The friction-based clutch actuation system 10 includes at least one, preferably a plurality of lead screws 26 cooperating with the electric motors 24. In the embodiment illustrated, one lead screw 26 is connected to one electric motor 24 to be rotated by the electric motor 24. The friction-based clutch actuation system 10 includes at least one, preferably a plurality of nuts 28 threadably engaging the lead screws 26. In the embodiment illustrated, one nut 28 is connected to one lead screw 26. The friction-based clutch actuation system 10 includes at least one, preferably a plurality of nut supports 30 interconnecting the nuts 28 and electric motors 24 to constrain the nuts 28 from rotating. In the embodiment illustrated, one nut support 30 is connected to one nut 28 and one electric motor 24. It should be appreciated that the nut support 30 allows axial movement, but prevents rotation, of the nut 28. It should also be appreciated that as a shaft of the electric motor 24 rotates, the lead screw 26 and nut 28 convert the rotary motion of the shaft of the electric motor 24 into an equivalent linear motion of the nut 28 because the nut 28 is constrained from rotating by the nut support 30.

The friction-based clutch actuation system 10 further includes at least one, preferably a plurality of piezoelectric actuators 32 cooperating with the nuts 28. In the embodiment illustrated, one piezoelectric actuator 32 is connected to one nut 28. Preferably, the nut 28 is rigidly attached to a base of the piezoelectric actuator 32 by suitable means (not shown). The piezoelectric actuators 32 are electrically connected to a source of power such as the controller 25 by suitable means such as wires (not shown). It should be appreciated that the piezoelectric actuators 32 are used for a force mode of the friction-based clutch actuation system 10. It should also be appreciated that magnetostrictive actuators, or other "active" material actuators capable of a length change in response to an applied energy field (e.g., electric, magnetic, thermal, etc.) may be used in place of the piezoelectric actuators 32. It should further be appreciated that, in the unengaged state, the clutch plates 18 and 22 are a small distance apart and control efforts to the piezoelectric actuators 32 and electric motors 24 are null.

The friction-based clutch actuation system 10 also includes at least one, preferably a plurality of thrust bearings 34 disposed between the piezoelectric actuators 32 and the output clutch plate 22. In the embodiment illustrated, one thrust bearing 34 is disposed between one piezoelectric actuator 32 and the output clutch plate 22. Preferably, the thrust bearing 34 is attached to an actuating end of the piezoelectric actuator 32 by suitable means (not shown). It should be appreciated that the thrust bearing 34 is used for uniform loading of the rotating clutch plate 22 by the non-rotating actuator 32.

In operation, to engage the friction-based clutch actuation system 10, the electric motors 24 are activated using a voltage command from the controller 25. As the electric motors 24 rotate their shafts, the output clutch plate 22 is moved closer to the input clutch plate 18. When the clutch plates 18 and 22 are in contact and undergoing a specific compression loading, the piezoelectric actuators 32 are activated to a desired voltage by the controller 25. The piezoelectric actuators 32 push on the thrust bearings 34, which in turn, squeeze the input clutch plate 18 and output clutch plate 22 together, thereby transmitting the torque from the input shaft 14 to the output shaft 16.

Figure 2:
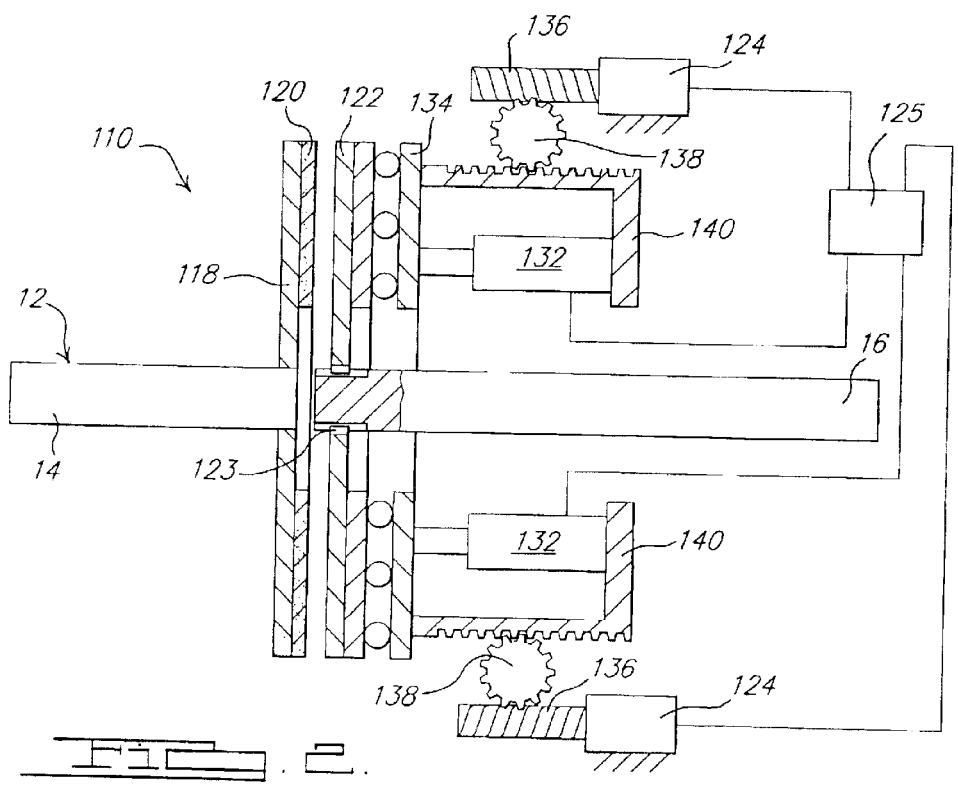
FIG. 2 is a diagrammatic fragmentary elevational view of another embodiment, according to the present invention, of the friction-based clutch actuation system of FIG. 1.

Referring to FIG. 2, another embodiment, according to the present invention, of the friction-based clutch actuation system 10 is shown. Like parts of the friction-based clutch actuation system 10 have like reference numerals increased by one hundred (100). In this embodiment, the friction-based clutch actuation system 110 includes at least one input clutch plate 118 operatively supported by and rotatable with the input shaft 114 The input clutch plate 118 has a friction lining 120 rigidly attached to one side thereof. The friction-based clutch actuation system 110 also includes at least one output clutch plate 122 operatively supported by and rotatable with the output shaft 116. Preferably, the output clutch plate 122 is splined 123 to the output shaft 116. It should be appreciated that the output clutch plate 122 can axially slide on the output shaft 116 while rotating with the output shaft 116.

The friction-based clutch actuation system 110 includes at least one, preferably a plurality of electric motors 124 operatively supported by the powertrain 12. The electric motors 124 are of a direct current (DC) type and electrically connected to a source of power such as an electric controller 125 by suitable means such as wires (not shown). The electric motors 124 are spaced circumferentially about the output shaft 16. It should be appreciated that the electric motors 124 are activated by a voltage command from the controller 125 and the shafts of the electric motors 124 rotate depending upon the control voltage command to the electric motors 124. It should also be appreciated that the electric motors 124 are used for a stroke mode of the friction-based clutch actuation system 110.

The friction-based clutch actuation system 110 includes at least one, preferably a plurality of worm gears 136 cooperating with the electric motors 124. In the embodiment illustrated, one worm gear 136 is connected to one electric motor 124 to be rotated by the electric motor 124. The friction-based clutch actuation system 110 includes at least one, preferably a plurality of pinion gears 138 engaging the worm gears 136. In the embodiment illustrated, one pinion gear 138 is engaged with one worm gear 136 for rotation by the worm gear 136. The friction-based clutch actuation system 110 includes at least one, preferably a plurality of racks 140 engaging the pinion gears 138. In the embodiment illustrated, one rack 140 is engaged with one pinion gear 138 for axially moving the rack 140 by the pinion gear 138. It should be appreciated that as a shaft of the electric motor 124 rotates, the connection between the worm gear 136 and pinion gear 138 converts the shaft rotation of the electric motor 124 into a rotation of the pinion gear 138 and the pinion gear 138 also meshes with the rack 140, thereby converting rotary motion of the pinion gear 138 into an equivalent linear motion of the rack 140.

The friction-based clutch actuation system 110 further includes at least one, preferably a plurality of piezoelectric actuators 132 cooperating with the racks 140. In the embodiment illustrated, one piezoelectric actuator 132 is connected to one rack 140. Preferably, the rack 140 is rigidly attached to a base of the piezoelectric actuator 132 by suitable means (not shown). The piezoelectric actuators 132 are electrically connected to a source of power such as the controller 125 by suitable means such as wires (not shown). It should be appreciated that the piezoelectric actuators 132 are used for a force mode of the friction-based clutch actuation system 110. It should also be appreciated that actuators using magnetostrictive, or other active materials providing a similar function, may be used in place of the piezoelectric actuators 132.

The friction-based clutch actuation system 110 includes a thrust bearing 134 disposed between the piezoelectric actuators 132 and the output clutch plate 122. In the embodiment illustrated, the thrust bearing 134 is disposed between one piezoelectric actuator 132 and the output clutch plate 122. Preferably, the thrust bearing 134 is attached to an actuating end of the piezoelectric actuator 132 by suitable means (not shown). It should be appreciated that, in the unengaged state, the clutch plates 118 and 122 are a small distance apart and control efforts to the piezoelectric actuators 132 and electric motors 124 are null. It should also be appreciated that the piezoelectric actuators 132 are positioned between bodies of the racks 140 and the thrust bearing 134 such that in the deactivated state, the piezoelectric actuators 132 fit exactly in the gap between the thrust bearing 134 and the bodies of the racks 140. It should further be appreciated that the thrust bearing 134 uniformly load the clutch plates 118 and 122 and isolate the rotating clutch plates 118 and 122 from non-rotating elements like the racks 140 and the piezoelectric actuators 132. It should also be appreciated that the racks 140 may be fixed to a single axially moving body for reasons of simplicity of operation, manufacture, and assembly.

In operation, to engage the friction-based clutch actuation system 110, the electric motors 124 are activated using a voltage command from the controller 125. As the shafts of the electric motors 124 rotate, the worm gears 136 and pinion gears 138 convert rotary motion of the shafts of the electric motors 124 into linear motion of the racks 140. As the racks 140 move toward the thrust bearings 134, the racks 140 push against the thrust bearings 134, which in turn, push the output clutch plate 122 on the output shaft 16 towards the input clutch plate 18 on the input shaft 14. When the clutch plates 118 and, 122 are brought together so that they are in contact and undergoing a specific compression loading, the electric motors 124 are held in their position and the piezoelectric actuators 132 are activated to a desired voltage by the controller 125. The piezoelectric actuators 132 push on the thrust bearing 134 with a high force. The actuation of the piezoelectric actuators 132 squeeze the input clutch plate 118 and output clutch plate 122 together, thereby engaging the clutch and transmitting torque from the input shaft 14 to the output shaft 16. It should be appreciated that as the piezoelectric actuator 132 is actuated, the base of the actuator 132 is attached to the body of the rack 140, applying a very high reaction force to the body of the rack 140, which in turn tries to back drive the pinion gear 138; however, the connection between the worm gear 136 and pinion gear 138 allows one-way drive only. It should also be appreciated that only the electric motor 124 can drive the pinion gear 138 and the friction-based clutch actuation system 10 locks when the pinion gear 138 tries to drive the shaft of the electric motor 124 and therefore, the rack 140 does not move and, as a result, acts as a stiff ground element.

Figure 3:
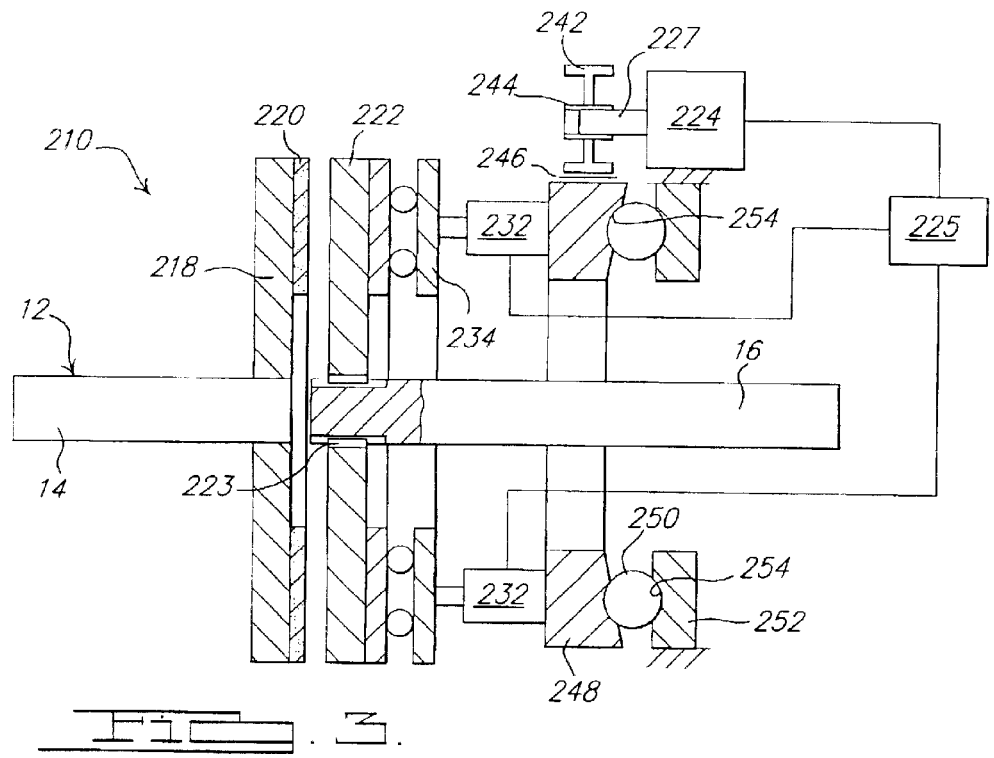
FIG. 3 is a diagrammatic fragmentary elevational view of yet another embodiment, according to the present invention, of the friction-based clutch actuation system of FIG. 1.

Referring to FIG. 3, yet another embodiment, according to the present invention, of the friction-based clutch actuation system 10 is shown. Like parts of the friction-based clutch actuation system 10 have like reference numerals increased by two hundred (200). In this embodiment, the friction-based clutch actuation system 210 includes at least one input clutch plate 218 operatively supported by and rotatable with the input shaft 14. The input clutch plate 218 has a friction lining 220 rigidly attached to one side thereof. The friction-based clutch actuation system 210 also includes at least one output clutch plate 222 operatively supported by and rotatable with the output shaft 16. Preferably, the output clutch plate 222 is splined 223 to the output shaft 16. It should be appreciated that the output clutch plate 222 can axially slide on the output shaft 16 while rotating with the output shaft 16.

The friction-based clutch actuation system 210 includes at least one electric motor 224 operatively supported by the powertrain 212. The electric motor 224 is of a direct current (DC) type and electrically connected to a source of power such as an electric controller 225 by suitable means such as wires (not shown). It should be appreciated that the electric motor 224 is activated by a voltage command from the controller 225 and a shaft 227 of the electric motor 224 rotates depending upon the control voltage command to the electric motor 224. It should also be appreciated that the electric motor 224 is used for a stroke mode of the friction-based clutch actuation system 210.

The friction-based clutch actuation system 210 includes a pinion gear 242 cooperating with the electric motor 224. In the embodiment illustrated, the pinion gear 242 is splined 244 to the shaft 227 of the electric motor 224 to be rotated by the electric motor 224. The friction-based clutch actuation system 210 includes a cam 248 to translate the rotational motion of the pinion gear 242 into an axial motion of the cam 248 and parts attached thereto. The cam 248 works cooperatively with a plurality of rigid balls 250 that are radially constrained by grooves 254 in a support plate 252 and the cam 248. Preferably, the balls 250 are made of a metal material such as steel. The depth of the grooves 354 varies in the circumferential direction, such that rotation of the cam 248 in one direction forces the balls 250 to a shallower part of the grooves 254, forcing the cam 248 to move in the axial direction. The support plate 252 and electric motor 224 are rigidly attached to the powertrain 12 and do not rotate. The cam 248 is driven by the pinion gear 242 via gear teeth 246 which are in meshing contact with the pinion gear 242. The gear teeth 246 form a gear on the cylindrical surface of the cam 248. It should be appreciated that the rotation of the shaft 227 of the electric motor 224 rotates the pinion gear 242, driving the cam 248. As the cam 248 moves axially, the spline 244 allows the axial motion of pinion gear 242 while maintaining meshing engagement between the pinion gear 242 and the cam 248. It should be appreciated that a mechanical interlock (not shown) may be used to lock the shaft 227 of the electric motor 224 in order to prevent rotation of the cam 248.

The friction-based clutch actuation system 210 further includes at least one, preferably a plurality of piezoelectric actuators 232 cooperating with the cam 248. In the embodiment illustrated, two piezoelectric actuators 232 are connected to one cam 248. Preferably, the cam 248 is rigidly attached to a base of the piezoelectric actuator 232 by suitable means (not shown). The piezoelectric actuators 232 are electrically connected to a source of power such as the controller 225 by suitable means such as wires (not shown). It should be appreciated that the piezoelectric actuators 232 are used for a force mode of the friction-based clutch actuation system 210. It should also be appreciated that actuators using magneto-restrictive or other materials of similar function may be used in place of the piezoelectric actuators 232.

The friction-based clutch actuation system 210 includes a thrust bearing 234 disposed between the piezoelectric actuators 232 and the output clutch plate 222. In the embodiment illustrated, a thrust bearing 234 is disposed between piezoelectric actuators 232 and the output clutch plate 222. Preferably, the thrust bearing 234 is attached to an actuating end of the piezoelectric actuator 232 by suitable means (not shown). It should be appreciated that, in the unengaged state, the clutch plates 218 and 222 are a small distance apart and control efforts to the piezoelectric actuators 232 and electric motor 224 are null. It should further be appreciated that the thrust bearing 234 uniformly loads the clutch plates 218 and 222 and isolates the rotating clutch plates 218 and 222 from partially-rotating elements like the cam 248 and the piezoelectric actuators 232.

In operation, to engage the friction-based clutch actuation system 210, the electric motors 224 are activated using a voltage command from the controller 225. As the shaft 227 of the electric motor 224 rotates, the cam 248, rigid balls 250 and pinion gear 242 convert rotary motion of the shaft 227 of the electric motor 224 into linear motion of the cam 248. As the cam 248 moves toward the thrust bearing 234, the cam 248 and piezoelectric actuators 232 push against the thrust bearing 234, which in turn, pushes the output clutch plate 222 on the output shaft 16 towards the input clutch plate 218 on the input shaft 14. When the clutch plates 218 and 222 are brought together so that they are pressed against each other with a predetermined axial thrust, the shaft of the electric motor 224 is held in its position and the piezoelectric actuators 232 are activated to a desired voltage by the controller 225. The piezoelectric actuators 232 push on the thrust bearings 234 with a high force. The actuation of the piezoelectric actuators 232 further presses the input clutch plate 218 and output clutch plate 222 together, thereby engaging the clutch and transmitting torque from the input shaft 14 to the output shaft 16. It should be appreciated that as the piezoelectric actuator 232 is actuated, the base of the actuator 232 is attached to the cam 248, applying a very high reaction force to the cam 248, which in turn is transmitted to the housing of the powertrain 12 via the balls 250 and the support plate 252. It should be appreciated that the ball/ramp geometry formed by the cam 248 and the balls 250 minimizes the chances of the cam 248 being back-driven solely by an axial thrust; however, the shaft 227 of the electric motor 224 may be locked mechanically, precluding the possibility of the cam 248 being back-driven by small reaction torques transmitted across the thrust bearing 234 by the engaged clutch plates 218 and 222.

Figure 4:
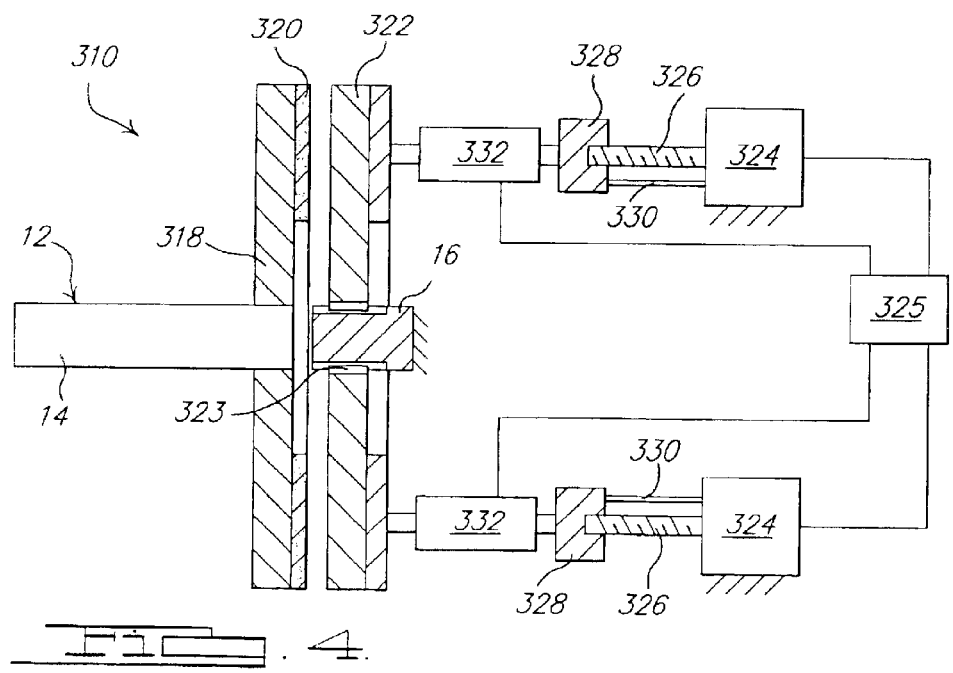
FIG. 4 is a diagrammatic fragmentary elevational view of still another embodiment, according to the present invention, of the friction-based clutch actuation system of FIG. 1.

Referring to FIG. 4, still another embodiment, according to the present invention, of the friction-based clutch actuation system 10 is shown. Like parts of the friction-based clutch actuation system 10 have like reference numerals increased by three hundred (300). In this embodiment, the friction-based clutch actuation system 310 includes at least one input clutch plate 318 operatively supported by and rotatable with the input shaft 14. The input clutch plate 318 has a friction lining 320 rigidly attached to one side thereof. The friction-based clutch actuation system 310 also includes at least one output clutch plate 322 operatively supported by the output shaft 16. Preferably, the output clutch plate 322 is splined 323 to the output shaft 16. It should be appreciated that the output shaft 16 is grounded or fixed to the powertrain 12 such that the output shaft 16 does not rotate. It should also be appreciated that the output clutch plate 322 can axially slide on the output shaft 16.

The friction-based clutch actuation system 310 includes at least one, preferably a plurality of electric motors 324 operatively supported by the powertrain 12. The electric motors 324 are of a direct current (DC) type and electrically connected to a source of power such as an electronic controller 325 by suitable means such as wires (not shown). The electric motors 324 are spaced circumferentially about the output shaft 16. It should be appreciated that the electric motors 324 are activated by a voltage command from the controller 325 and used for a stroke mode of the friction-based clutch actuation system 310.

The friction-based clutch actuation system 310 includes at least one, preferably a plurality of lead screws 326 cooperating with the electric motors 324. In the embodiment illustrated, one lead screw 326 is connected to one electric motor 324 to be rotated by the electric motor 324. The friction-based clutch actuation system 310 includes at least one, preferably a plurality of nuts 328 threadably engaging the lead screws 326. In the embodiment illustrated, one nut 328 is connected to one lead screw 326. The friction-based clutch actuation system 310 includes at least one, preferably a plurality of nut supports 330 interconnecting the nuts 328 and electric motors 324 to constrain the nuts 328 from rotating. In the embodiment illustrated, one nut support 330 is connected to one nut 328 and one electric motor 324. It should be appreciated that the nut support 330 allows axial movement, but prevents rotation, of the nut 328. It should also be appreciated that as a shaft of the electric motor 324 rotates, the lead screw 326 and nut 328 convert the rotary motion of the shaft of the electric motor 324 into an equivalent linear motion of the nut 328 because the nut 328 is constrained from rotating by the nut support 330.

The friction-based clutch actuation system 10 further includes at least one, preferably a plurality of piezoelectric actuators 332 cooperating with the nuts 328. In the embodiment illustrated, one piezoelectric actuator 332 is connected to one nut 328. Preferably, the nut 328 is rigidly attached to a base of the piezoelectric actuator 332 by suitable means (not shown). The piezoelectric actuators 332 are electrically connected to a source of power such as the controller 325 by suitable means such as wires (not shown). It should be appreciated that the piezoelectric actuators 332 are used for a force mode of the friction-based clutch actuation system 310. It should also be appreciated that magnetostrictive actuators may be used in place of the piezoelectric actuators 332. It should further be appreciated that, in the unengaged state, the clutch plates 318 and 322 are a small distance apart and control efforts to the piezoelectric actuators 332 and electric motors 324 are null.

In operation, to engage the friction-based clutch actuation system 310, the electric motors 324 are activated using a voltage command from the controller 325. As the electric motors 324 rotate their shafts, the output clutch plate 22 is moved closer to the input clutch plate 318. When the clutch plates 318 and 322 are in contact, the piezoelectric actuators 332 are activated to a desired voltage by the controller 325. The piezoelectric actuators 332 push on the output clutch plate 322, which in turn, squeezes the input clutch plate 318 and output clutch plate 322 together, thereby acting as a brake to reduce the torque of the input shaft 14. It should be appreciated that the friction-based clutch actuation system 310 is a non-rotating clutch or brake.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A friction-based clutch actuation system comprising:
   a rotatable input shaft;
   an output shaft;
   at least one input clutch plate operatively supported by said input shaft;
   at least one output clutch plate operatively supported by said output shaft and moveable thereon;
   at least one electric motor;
   at least one piezoelectric actuator operatively connected to said at least one electric motor; and
   a controller electrically connected to said at least one electric motor and said at least one piezoelectric actuator to activate said at least one electric motor to move said piezoelectric actuator axially relative to said at least one output clutch plate and to activate said piezoelectric actuator to apply a force to said at least one output clutch plate to engage said at least one input clutch plate.

2. A friction-based clutch actuation system as set forth in claim 1 including at least one lead screw connected to said at least one electric motor.

3. A friction-based clutch actuation system as set forth in claim 2 including at least one nut engaging said at least one lead screw and connected to said at lest one piezoelectric actuator.

4. A friction-based clutch actuation system in claim 3 including at least one nut support interconnecting said at least one nut and said at least one electric motor.

5. A friction-based clutch actuation system as set forth in claim 1 including at least one worm gear connected to said at least one electric motor.

6. A friction-based clutch actuation system as set forth in claim 5 including at least one pinion gear engaging said at least one worm gear.

7. A friction-based clutch actuation system in claim 6 including at least one rack engaging said at least one pinion gear and connected to said at least one piezoelectric actuator.

8. A friction-based clutch actuation system as set forth in claim 1 including at least one pinion gear connected to said at least one electric motor.

9. A friction-based clutch actuation system as set forth in claim 8 including at least one cam connected to said output shaft and engaging said at least one pinion gear and connected to said at least one piezoelectric actuator.

10. A friction-based clutch actuation system as set forth in claim 9 including at least one fixed support plate spaced axially from said at least one cam.

11. A friction-based clutch actuation system as set forth in claim 10 including at least one ball disposed between said support plate and said at least one cam.

12. A friction-based clutch actuation system as set forth in claim 1 including at least one thrust bearing disposed between said at least one piezoelectric actuator and said at least one output clutch plate.

13. A friction-based clutch actuation system as set forth in claim 1 including a spline connection between said at least one output clutch plate and said output shaft to allow said at least one output clutch plate to move axially on said output shaft.

14. A friction-based clutch actuation system as set forth in claim 1 including a friction lining connected to said at least one input clutch plate.

15. A friction-based clutch actuation system as set forth in claim 1 wherein said output shaft is rotatable.

16. A friction-based clutch actuation system as set forth in claim 1 wherein said output shaft is grounded.

17. A friction-based clutch actuation system comprising:
    a rotatable input shaft;
    an output shaft;
    at least one input clutch plate operatively supported by said input shaft;
    at least one output clutch plate operatively supported by said output shaft and moveable thereon;
    at least one electric motor;
    at least one piezoelectric actuator operatively connected to said at least one electric motor; and
    a controller electrically connected to said at least one electric motor and said at least one piezoelectric actuator to activate said at least one electric motor to move said piezoelectric actuator axially relative to said at least one output clutch plate and to generate a signal to activate said piezoelectric actuator to apply a force to said at least one output clutch plate to engage said at least one input clutch plate.

18. A friction-based clutch actuation system as set forth in claim 17 including at least one lead screw connected to said at least one electric motor.

19. A friction-based clutch actuation system as set forth in claim 18 including at least one nut engaging said at least one lead screw and connected to said at lest one piezoelectric actuator.

20. A friction-based clutch actuation system as set forth in claim 19 including at least one nut support interconnecting said at least one nut and said at least one electric motor.

21. A friction-based clutch actuation system as set forth in claim 17 including at least one worm gear connected to said at least one electric motor.

22. A friction-based clutch actuation system as set forth in claim 21 including at least one pinion gear engaging said at least one worm gear.

23. A friction-based clutch actuation system as set forth in claim 22 including at least one rack engaging said at least one pinion gear and connected to said at least one piezoelectric actuator.

24. A friction-based clutch actuation system as set forth in claim 17 including at least one pinion gear connected to said at least one electric motor.

25. A friction-based clutch actuation system as set forth in claim 24 including at least one cam connected to said output shaft and engaging said at least one pinion gear and connected to said at least one piezoelectric actuator.

26. A friction-based clutch actuation system as set forth in claim 25 including at least one fixed support plate spaced axially from said at least one cam.

27. A friction-based clutch actuation system as set forth in claim 26 including at least one ball disposed between said support plate and said at least one cam.

28. A friction-based clutch actuation system as set forth in claim 17 including at least one thrust bearing disposed between said at least one piezoelectric actuator and said at least one output clutch plate.

29. A friction-based clutch actuation system as set forth in claim 17 including a spline connection between said at least one output clutch plate and said output shaft to allow said at least one output clutch plate to move axially on said output shaft.

30. A friction-based clutch actuation system as set forth in claim 17 including a friction lining connected to said at least one input clutch plate.

31. A friction-based clutch actuation system comprising:

a rotatable input shaft;

a rotatable output shaft;

at least one input clutch plate operatively supported by said input shaft;

at least one output clutch plate operatively supported by said output shaft and moveable thereon;

at least one electric motor;

at least one lead screw connected to said at least one electric motor;

at least one nut engaging said at least one lead screw;

at least one piezoelectric actuator operatively connected to said at least one nut; and a controller electrically connected to said at least one electric motor and said at least one piezoelectric actuator to activate said at least one electric motor to move said piezoelectric actuator axially relative to said at least one output clutch plate and to generate a signal to activate said piezoelectric actuator to apply a force to said at least one output clutch plate to engage said at least one input clutch plate.

32. A friction-based clutch actuation system comprising:

a rotatable input shaft;

a rotatable output shaft;

at least one input clutch plate operatively supported by said input shaft;

at least one output clutch plate operatively supported by said output shaft and moveable thereon;

at least one electric motor;

at least one worm gear connected to said at least one electric motor;

at least one pinion gear engaging said at least one worm gear;

at least one rack engaging said at least one pinion gear;

at least one piezoelectric actuator connected to said at least one rack; and a controller electrically connected to said at least one electric motor and said at least one piezoelectric actuator to activate said at least one electric motor to move said piezoelectric actuator axially relative to said at least one output clutch plate and to generate a signal to activate said piezoelectric actuator to apply a force to said at least one output clutch plate to engage said at least one input clutch plate.

33. A friction-based clutch actuation system comprising:

a rotatable input shaft;

a grounded output shaft;

at least one input clutch plate operatively supported by said input shaft;

at least one output clutch plate operatively supported by said output shaft and moveable thereon;

at least one electric motor;

at least one lead screw connected to said at least one electric motor;

at least one nut engaging said at least one lead screw;

at least one piezoelectric actuator operatively connected to said at least one nut; and a controller electrically connected to said at least one electric motor and said at least one piezoelectric actuator to activate said at least one electric motor to move said piezoelectric actuator axially relative to said at least one output clutch plate and to generate a signal to activate said piezoelectric actuator to apply a force to said at least one output clutch plate to engage said at least one input clutch plate.

34. A friction-based clutch actuation system comprising:

a rotatable input shaft;

a rotatable output shaft;

at least one input clutch plate operatively supported by said input shaft;

at least one output clutch plate operatively supported by said output shaft and moveable thereon;

at least one electric motor;

at least one pinion gear connected to said at least one electric motor;

at least one cam connected to said output shaft and engaging said at least one pinion gear;

at least one fixed support plate spaced axially from said at least one cam;

at least one ball disposed between said support plate and said at least one cam;

at least one piezoelectric actuator operatively connected to said at least one cam; and a controller electrically connected to said at least one electric motor and said at least one piezoelectric actuator to activate said at least one electric motor to move said piezoelectric actuator axially relative to said at least one output clutch plate and to generate a signal to activate said piezoelectric actuator to apply a force to said at least one output clutch plate to engage said at least one input clutch plate.

* * * * *